United States Patent
Fortune et al.

(10) Patent No.: US 12,330,595 B1
(45) Date of Patent: Jun. 17, 2025

(54) HITCH-MOUNTED LIFT RACK FOR BICYCLES OR OTHER EQUIPMENT

(71) Applicant: Saris Equipment, LLC, Edison, NJ (US)

(72) Inventors: Christopher Fortune, Madison, WI (US); Erik Eagleman, Madison, WI (US); Michael Hammond, Monona, WI (US); Kyle Neuser, Madison, WI (US)

(73) Assignee: Saris Equipment, LLC, Edison, NJ (US)

( * ) Notice: Subject to any disclaimer, the term of this patent is extended or adjusted under 35 U.S.C. 154(b) by 696 days.

(21) Appl. No.: 17/122,614

(22) Filed: Dec. 15, 2020

Related U.S. Application Data

(60) Provisional application No. 62/949,736, filed on Dec. 18, 2019.

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .................................. B60R 9/06; B60R 9/10
USPC .................................. 414/462–466; 224/924
See application file for complete search history.

(56) References Cited

U.S. PATENT DOCUMENTS

| | | |
|---|---|---|
| 3,931,903 A | 1/1976 | Johnson |
| 4,738,581 A | 4/1988 | Kuhlman |
| 4,741,660 A | 5/1988 | Kent |
| 4,775,282 A | 10/1988 | Van Vliet |
| 5,011,361 A | 4/1991 | Peterson |
| 5,137,411 A | 8/1992 | Eul et al. |
| 5,431,522 A | 7/1995 | Ross |
| 5,456,564 A | 10/1995 | Bianchini |
| 5,482,424 A | 1/1996 | Jones et al. |
| 5,567,107 A | 10/1996 | Bruno et al. |

(Continued)

FOREIGN PATENT DOCUMENTS

| | | |
|---|---|---|
| DE | 20 2015 103 506 U1 | 8/2015 |
| DE | 20 2017 105 069 U1 | 10/2017 |

(Continued)

*Primary Examiner* — Lynn E Schwenning
(74) *Attorney, Agent, or Firm* — Leason Ellis LLP

(57) ABSTRACT

A vehicle-mounted carrier for transporting equipment, such as bicycles, includes a hitch receiver engagement portion having a hitch engagement member engageable with the hitch receiver, and an equipment support portion pivotably interconnected with the hitch receiver portion. The equipment support portion includes a mast defining upper and lower ends, an extension member that is movable between lowered and raised positions, a drive arrangement for selectively moving the extension member between the lowered and raised positions, and an equipment support arrangement carried by the extension member. The equipment support arrangement is movable via the drive arrangement between lowered and raised positions upon movement of the extension member between the lowered and raised positions. A tilt actuator arrangement provides pivoting movement of the equipment support portion about the pivot connection from an upright position to a tilt position in response to movement of the extension member to a tilt actuation position.

24 Claims, 18 Drawing Sheets

(56) References Cited

U.S. PATENT DOCUMENTS

| | | | |
|---|---|---|---|
| 5,690,260 A * | 11/1997 | Aikins | B60R 9/10 224/532 |
| 5,816,763 A | 10/1998 | Hamann et al. | |
| 5,984,613 A | 11/1999 | Motilewa | |
| 6,105,843 A | 8/2000 | Dollesin | |
| 6,386,817 B1 | 5/2002 | Cash | |
| 6,524,054 B2 | 2/2003 | Maney | |
| 6,579,055 B1 | 6/2003 | Williams | |
| 6,595,398 B2 | 7/2003 | Himel, Jr. | |
| 6,655,895 B1 | 12/2003 | Dahl | |
| 6,692,215 B1 * | 2/2004 | Panzarella | B60P 3/122 414/921 |
| 6,729,827 B1 | 5/2004 | Williams et al. | |
| 6,884,018 B1 | 4/2005 | Dugan et al. | |
| 6,887,027 B2 | 5/2005 | O'Leary et al. | |
| 7,165,704 B2 * | 1/2007 | Lo | B60R 9/06 224/570 |
| 7,261,228 B2 * | 8/2007 | Prescott | B60R 9/06 224/924 |
| 7,798,760 B2 | 9/2010 | Strassman et al. | |
| 8,132,997 B2 | 3/2012 | Reuille et al. | |
| 8,783,536 B1 | 7/2014 | Julian | |
| 8,926,253 B2 * | 1/2015 | Uttech | B60P 1/44 414/921 |
| 10,752,179 B2 * | 8/2020 | Ramsdell | B60R 9/06 |
| 2003/0156930 A1 | 8/2003 | Ahedo, Jr. | |
| 2003/0165376 A1 | 9/2003 | Bruno et al. | |
| 2008/0085176 A1 | 4/2008 | Statkus | |
| 2012/0237324 A1 | 9/2012 | Egan | |
| 2013/0140794 A1 * | 6/2013 | Bohse | B60D 1/52 280/507 |
| 2013/0142602 A1 | 6/2013 | Barnts | |
| 2015/0367785 A1 | 12/2015 | Sanders | |

FOREIGN PATENT DOCUMENTS

| | | | | |
|---|---|---|---|---|
| EP | 0755826 B1 | | 6/2000 | |
| EP | 3251898 | * | 12/2017 | B60R 9/06 |

* cited by examiner

HITCH-MOUNTED LIFT RACK FOR BICYCLES OR OTHER EQUIPMENT

CROSS-REFERENCE TO RELATED APPLICATIONS

This application claims priority to U.S. Provisional Patent Application Ser. No. 62/949,736, filed Dec. 18, 2019, entitled "Hitch-Mounted Rack for Bicycles," the entirety of which is herein incorporated by reference.

BACKGROUND AND SUMMARY

Vehicle-mounted equipment carriers, such as those adapted to be secured to the hitch receiver of a vehicle for carrying equipment such as bicycles, are well known and function satisfactorily for transporting bicycles from one location to another. Equipment carriers such as this typically require a user to lift the bicycle onto the structure of the carrier that secures and supports the bicycle during transport. This is typically not a serious drawback for most bicycles. However, the task of lifting the bicycle can be more daunting in the case of an electric bicycle, which includes a motor and other components that increase the weight of the bicycle. The object of the present invention is to address this difficulty and ease the process of loading an item of equipment, such as an electric bicycle, onto a vehicle-mounted equipment carrier.

In accordance with the present invention, an equipment carrier for transporting an item of equipment on a vehicle having a hitch receiver includes a hitch receiver engagement portion that includes a hitch receiver engagement member configured to be received in the hitch receiver, and an equipment support portion interconnected with the hitch receiver portion via a pivot connection. The equipment support portion includes a mast defining an upper end and a lower end, an extension member that is movable relative to the mast between a lowered position and a raised position, a drive arrangement interposed between the mast and the extension member for selectively moving the extension member between the lowered and raised positions, and an equipment support arrangement carried by the extension member. The equipment support arrangement is movable via the drive arrangement between a lowered position and a raised position upon movement of the extension member between the lowered and raised positions. The equipment carrier further includes a tilt actuator arrangement that provides pivoting movement of the equipment support portion about the pivot connection relative to the hitch receiver engagement portion from an upright position to a tilt position in response to movement of the extension member to a tilt actuation position. In this manner, the equipment carrier can be positioned to allow access to the rear of the vehicle, such as for accessing the tailgate or trunk of the vehicle.

The equipment support portion may include a mounting bracket interconnected with the mast, and the pivot connection may be interposed between the hitch receiver engagement portion and the mounting bracket. In one form, the hitch receiver engagement portion includes an upstanding mounting member, and the pivot connection is interposed between the upstanding mounting member and the mounting bracket of the equipment support portion. A stop arrangement may be interposed between the mounting bracket and the mounting member, and is configured and arranged to limit pivoting movement of the equipment support portion about the pivot connection in a first direction of rotation to assist in maintaining the equipment support portion in the upright position.

The mast defines a lower end, and the extension member includes a lower end portion with which the equipment support arrangement is engaged. A roller may be provided on the hitch receiver engagement portion, and is engaged with the lower end portion of the extension member. The roller is positioned to limit pivoting movement of the equipment support portion about the pivot connection in a second direction of rotation to assist in maintaining the equipment support portion in the upright position while guiding movement of the extension member between the lowered and raised positions.

The tilt actuator arrangement may be in the form of a ramped actuator surface associated with the extension member, such that movement of the extension member upwardly from the raised position causes the roller to ride on the ramped actuator surface and to cause pivoting movement of the equipment carrier portion to the tilt position about the pivot connection in the second direction of rotation.

The equipment support portion may be in the form of a base secured to a lower end defined by the extension member, and the base may include a wheel arrangement for facilitating movement of the equipment carrier on a supporting surface. Equipment support structure is carried by the base, and may be pivotably engaged with the base for movement between a lowered operative position and a raised storage position. Representatively, the equipment support structure may be in the form of a central frame member extending from the base, and one or more equipment carrying members secured to the central frame member. Each of the one or more equipment carrying members may be in the form of a tray support secured to the central frame member and a pair of tray members secured to the tray support. The tray members may be movably mounted to the tray support for movement between a retracted position and an extended position.

A frame may be interconnected with the base and extend upwardly therefrom, and one or more equipment engagement stabilizing members may be movably interconnected with the frame and selectively engageable with one or more items of equipment positioned on the equipment support portion.

The present invention also contemplates a method of operating a vehicle-mounted equipment carrier, substantially in accordance with the foregoing summary.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention will become more readily apparent by referring to the exemplary, and therefore non-limiting, embodiments illustrated in the drawings accompanying and forming a part of this specification, wherein like reference numerals designate the same elements in the several views.

In the drawings.

Figure 1:
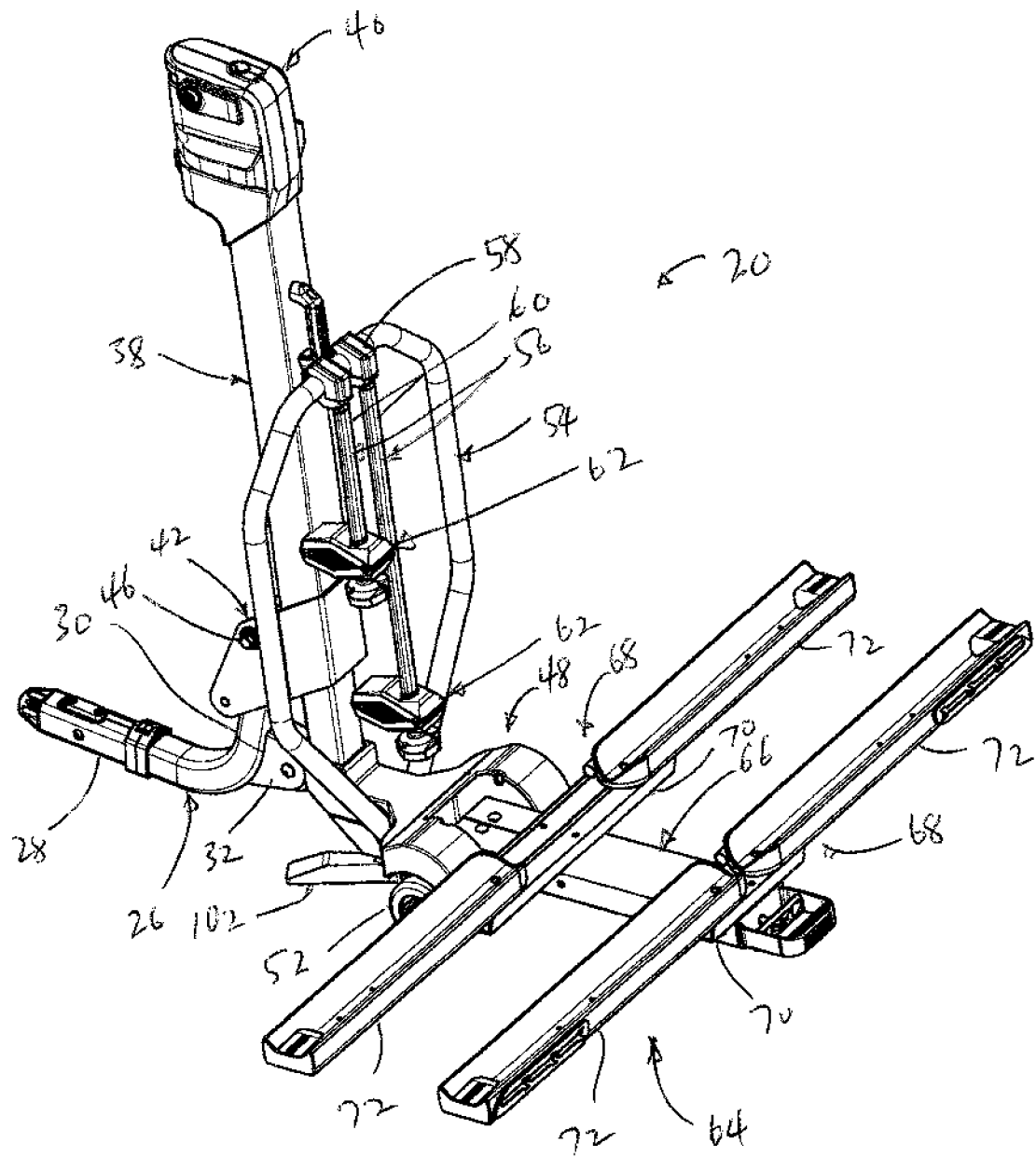
FIG. 1 is an isometric view of a vehicle-mounted lift rack in accordance with an embodiment of the present invention, for carrying equipment such as one or more bicycles on a vehicle.

In describing the embodiments of the invention which are illustrated in the drawings, specific terminology will be resorted to for the sake of clarity. However, it is not intended that the invention be limited to be specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The various features and advantageous details of the subject matter disclosed herein are explained more fully with reference to the non-limiting embodiments described in detail in the following description.

Referring to the following description in which like reference numerals represent like parts throughout the disclosure, a vehicle-mounted equipment carrier in accordance with the present invention is shown in FIGS. 1-4 at 20. In the illustrated embodiment, the equipment carrier 20 is configured to carry one or more bicycles in a manner to be explained. It is understood, however, that equipment carrier 20 may alternatively be configured to carry other items that are suited for being transported exteriorly on a vehicle, and is not limited for use in transporting bicycles.

The equipment carrier 20 generally includes a hitch receiver engagement portion 22 configured to engage the hitch receiver of a vehicle, and an equipment support portion 24 configured to support one or more bicycles. In the illustrated embodiment, the hitch receiver engagement portion includes a hitch engagement member 26 that includes a front section 28 adapted to be received within a rearwardly facing passage defined by a vehicle hitch receiver, and a rear upstanding section 30. The front section 28 of hitch engagement member includes a hitch mounting arrangement that enables front section 28 to be received within the passage of a vehicle-mounted hitch receiver and secured against movement, in a manner as is known. Hitch receiver engagement portion 22 also includes a roller mounting bracket 32 secured toward the lower end of rear upstanding section 30, and a rearwardly facing roller 34 rotatably supported by roller mounting bracket 32. A cradle 36 is secured to the front surface of rear upstanding section 30.

Equipment support portion 24 includes an upstanding tubular mast 38 having a head 40 at its upper end. A bracket 42 is secured to the lower end of mast 38. Bracket 42 defines a pair of spaced apart walls 44 provided with aligned openings. The upper end of rear upstanding section 30 of hitch engagement member 26 is also provided with a transverse opening or passage, which is aligned with the openings in bracket walls 44. A pivot pin 46 extends through the openings in bracket walls 44 and the transverse opening or passage in rear upstanding section 30 of hitch engagement member 26, so as to pivotably mount the lower end of mast 38 to the upper end of rear upstanding section 30, and to thereby provide a pivot connection of equipment support portion 24 to hitch receiver engagement portion 22 about a pivot axis defined by pin 46.

Equipment support portion 24 further includes a base 48. An extension member 50 extends upwardly from the forward end of base 48, into an internal passage defined by mast 38. A set of rotatable ground-engaging wheels 52 are secured to an axle mounted at the rearward end of base 48. A stabilizing frame 54 extends upwardly from base 48 at a location spaced rearwardly from mast 38. In the illustrated embodiment, frame 54 has a generally ovoid configuration, although it is understood that any other satisfactory equipment-supporting or stabilizing structure having any desired shape or configuration may be employed. Equipment stabilizing members 56 are engaged with frame 54. In the illustrated embodiment, each equipment stabilizing member 56 has a collar 58 rotatably mounted to frame 54, a bar 60 extending from collar 58, and an equipment engagement assembly 62 at the outer end of bar 60. The bars 60 are of different length, which enable the equipment stabilizing members 56 to engage items of equipment at different locations relative to frame 54. The equipment engagement assemblies 62 may representatively be in the form of lobster claw-type engagement assemblies that can be selectively tightened onto or loosened from an item of equipment using a screw mechanism, which may perform the dual function of tightening the equipment engagement assembly 62 onto the item of equipment and clamping the equipment support member collar 58 onto the frame 54, in a manner as is known. It is understood, however, that any other type of equipment support or engagement arrangement maybe employed for use with a support structure such as frame 54 to stabilize an item of equipment.

Base 48 further carries an equipment support 64 at its rear end. In the illustrated embodiment, the equipment support 64 is configured to provide support from below for a pair of bicycles. It is understood, however, that any other type of support arrangement for carrying other types of equipment maybe carried by base 48. The equipment support 64 of the illustrated embodiment includes an axially extending central support number 66, in combination with a pair of wheel-supporting tray assemblies 68 secured to central support number 66.

Figure 2:
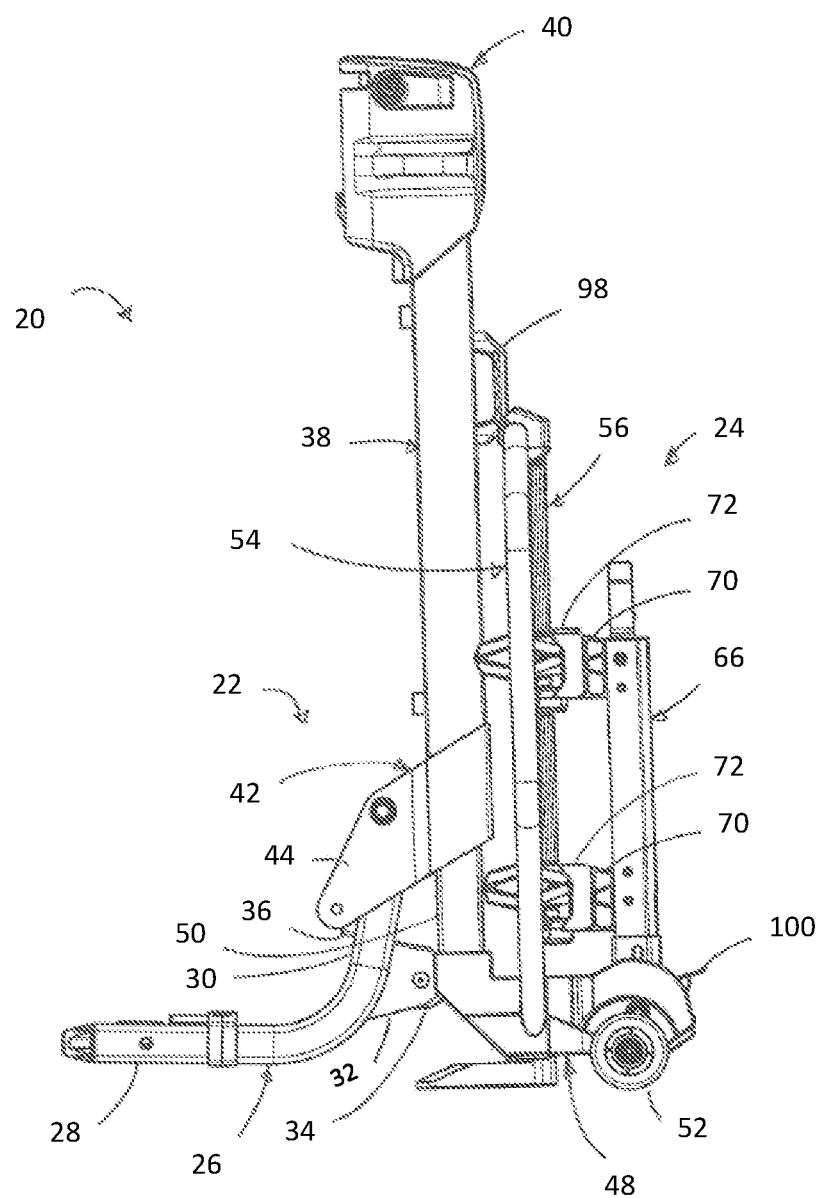
FIG. 2 is a side elevation view of the vehicle-mounted lift rack of FIG. 1.
Figure 3:
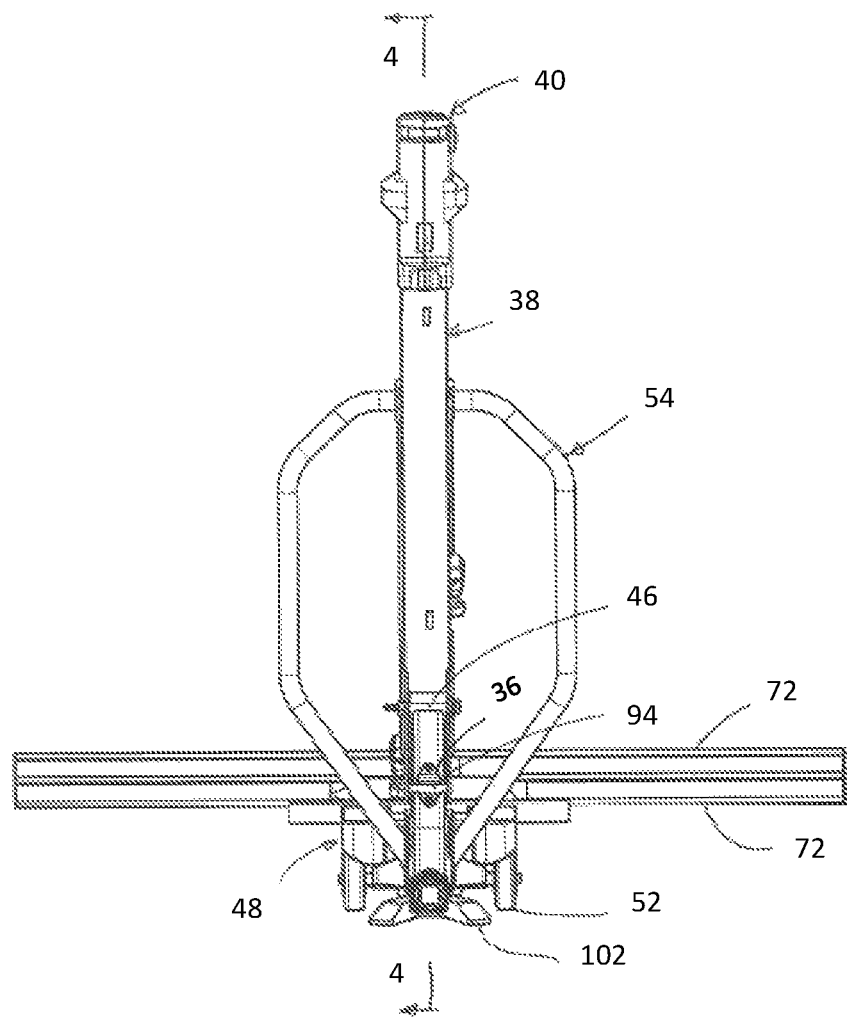
FIG. 3 is a front elevation view of the vehicle-mounted lift rack of FIGS. 1 and 2.
Figure 4:
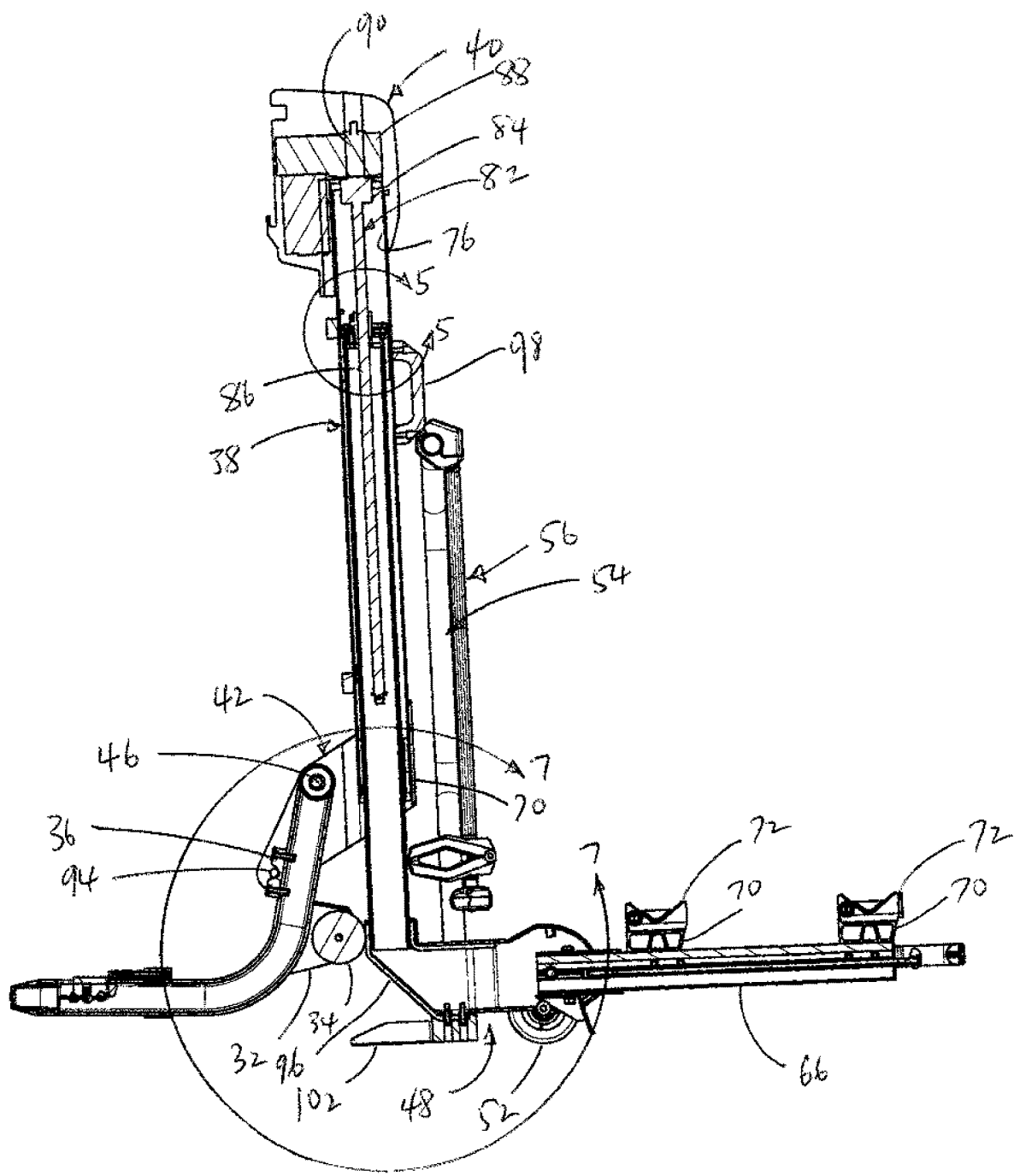
FIG. 4 is a section view taken along line 4-4 of FIG. 3.

In the illustrated embodiment, the central support member 66 is pivotably secured to base 48 between wheels 52, for movement between a lowered, operative position as shown in FIG. 1 and a raised, storage position as shown in FIG. 2. Also in the illustrated embodiment, each tray assembly 68 includes a central tray support member 70 and a pair of tray members 72. Each set of tray members 72 may be mounted to its associated tray support member 70 for transverse movement between inward and outward positions to accommodate bicycles having wheel bases of different lengths. Representatively, tray support members 70 may each have an upwardly facing T-slot, with T-nuts on each tray member 72 engaged within the T-slot to allow each tray 72 to be secured in varying positions along the length of tray support member 70. It is understood, however, that any other satisfactory adjustable position arrangement may be employed, and also understood that the bicycle-supporting trays may have a fixed length. In a manner as is known, ratchet straps or the like may be provided on the trays 72 to be secured about a lower area of a bicycle wheel supported on the tray 72.

Extension member 50 is movable relative to mast 38 in a manner that enables base 48 to be moved upwardly and downwardly between raised and lowered positions, respectively. In the illustrated embodiment, with reference to FIGS. 4 and 5, mast 38 is in the form of a tubular member having an open lower end, with extension member 50 extending through the open lower end of mast 38. Extension member 50 is axially movable in a telescoping manner within an internal passage 76 defined by mast 38, which extends upwardly from the open lower end of mast 38. An upper bearing 78 is secured at the upper end of extension member 50 to accommodate upward and downward sliding movement of the upper end of extension member 50 within internal passage 76, and a lower bearing 80 (FIG. 7) is positioned at the lower end of mast internal passage 76 adjacent the lower end of mast 50 for supporting a lower area of extension member 50 upon movement of extension number 50 relative to mast 38.

Figure 5:
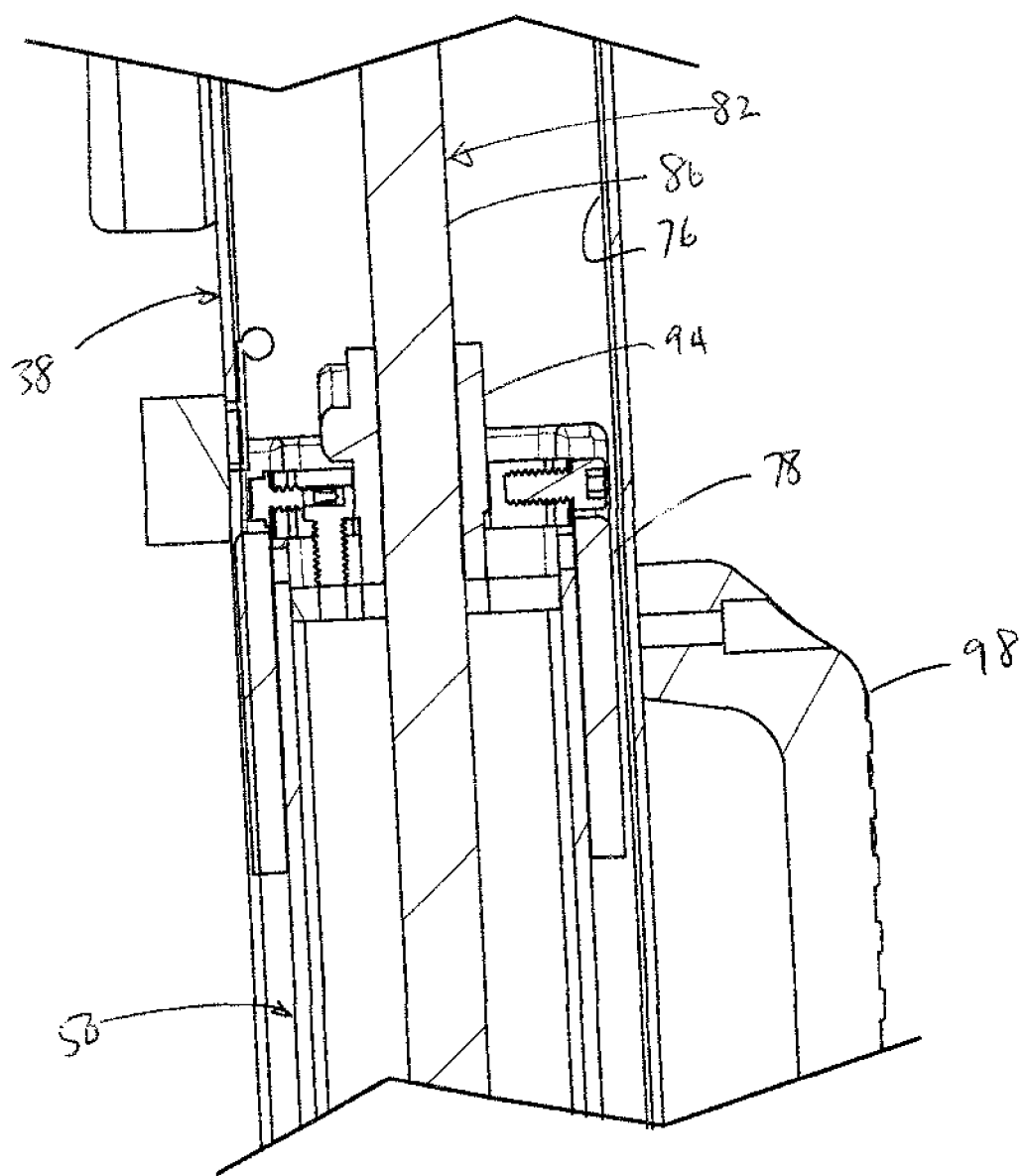
FIG. 5 is an enlarged partial section view with reference to line 5-5 of FIG. 4.
Figure 6:
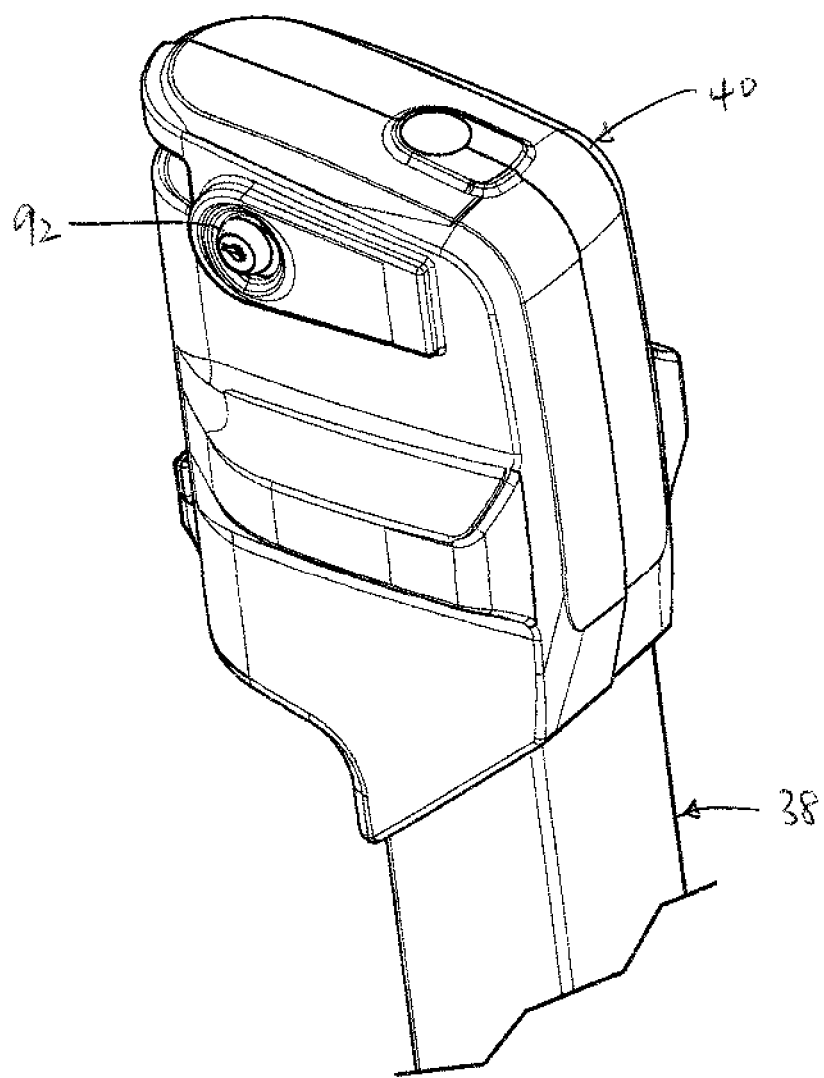
FIG. 6 is a partial isometric view illustrating the upper end area of the vehicle-mounted lift rack of FIGS. 1-3.

A rotatable lead screw 82 having a head 84 and a shaft 86 is rotatably mounted at the upper end of mast internal passage 76 and extends downwardly throughout a majority of the length of mast internal passage 76. Head 40, which is secured to the upper end of mast 38, defines an interior that houses a motor 88. The motor 88 selectively imparts rotation to a rotatable output member 90, which is engaged with the lead screw head 84 so as to selectively impart rotation to lead screw 82 upon operation of motor 88. As shown in FIG. 6, head 40 may be provided with a key-operated switch 92, which can be selectively actuated so as to operate motor 88 to provide rotation of output number 90 in either a first rotational direction or a second, opposite rotational direction so as to control the direction of rotation of lead screw 82. FIG. 5 illustrates a lead nut 94, which is secured at the upper end of extension member 50. In a manner as is known, lead nut 94 has internal threads that match the external threads of lead screw shaft 86. In this manner, rotation of lead screw 82 in a first direction of rotation causes extension member 50 to move in a first direction within mast internal passage 76, for example a lowering direction, and rotation of lead screw 82 in the second direction of rotation causes extension number 50 to move in a second direction within mast internal passage 76, for example a raising direction.

Figure 7:
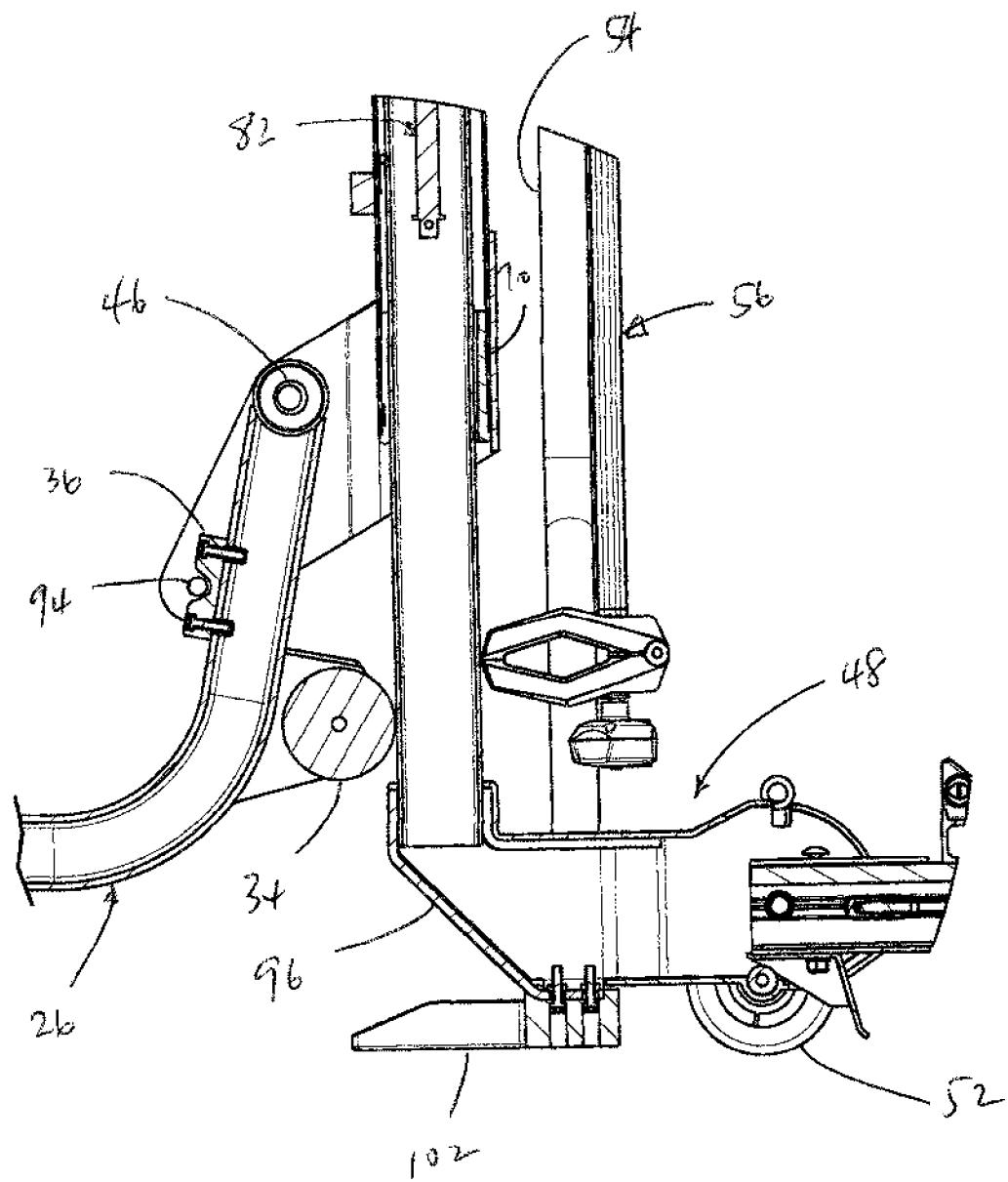
FIG. 7 is an enlarged partial section view with reference to line 7-7 of FIG. 4, showing an extension member of the vehicle-mounted lift rack in a raised position.

As shown in FIG. 7, roller 34 bears against the exterior of a front wall of extension number 50 below the open lower end of mast 38. Roller 34 is positioned such that, when bearing against the front wall of extension member 50, extension number 50 and mast 38 are maintained in a generally upright, vertical orientation. This position of extension member 50 and mast 38 is maintained during movement of extension member 50 between raised and lowered positions when extension member 50 is moved so as to raise and lower base 48 between a lowered, loading position at which bicycles are loaded onto equipment support 64, in a manner to be explained, and a raised position during normal use and transport. With roller 34 engaged with the front wall of extension member 50 in this manner, a cross-pin 94, which extends between bracket walls 44, is engaged with cradle 36 to assist in maintaining mast 38 and extension member 50 in the upright orientation.

Figure 8:
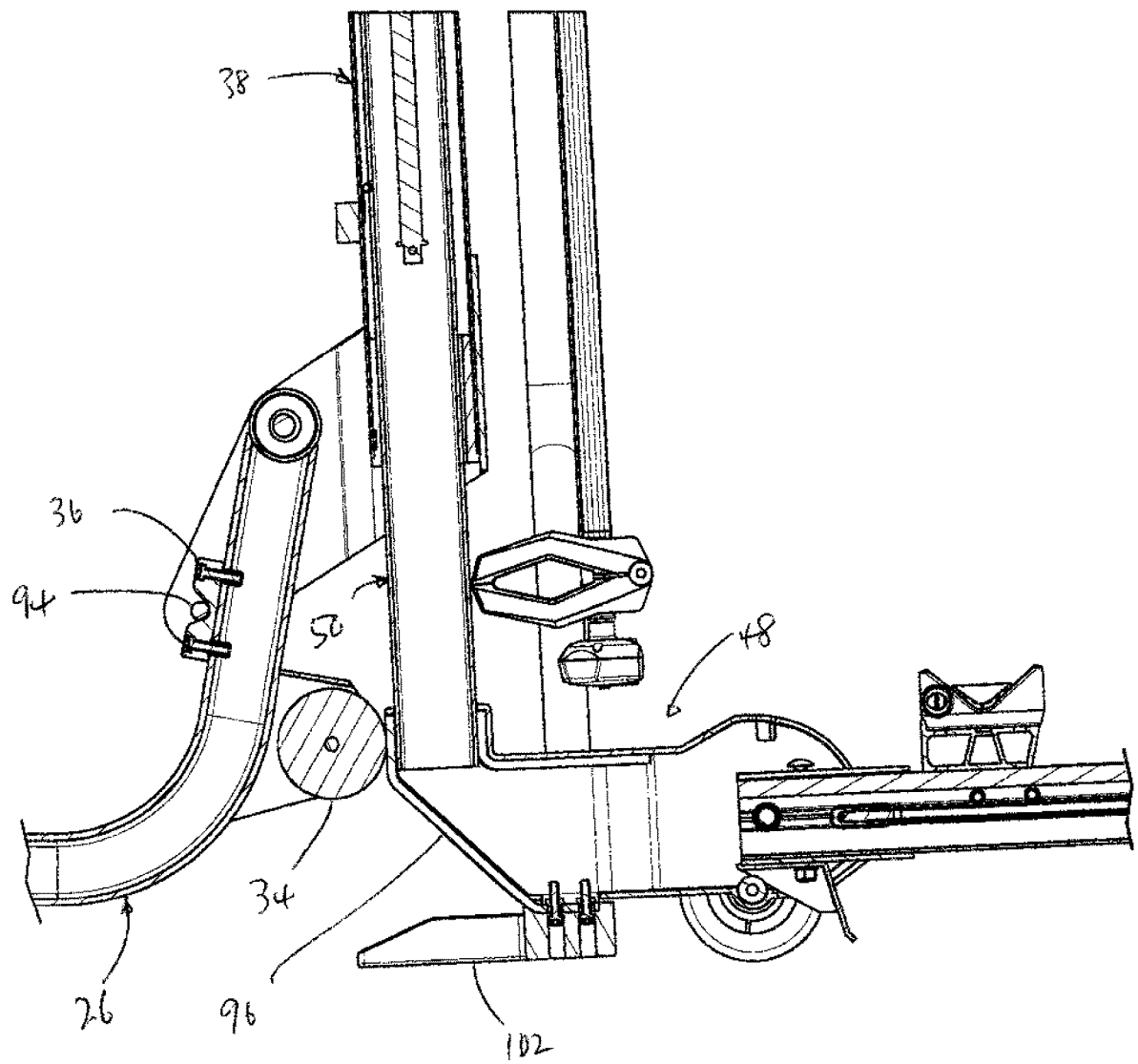
FIG. 8 is a view similar to FIG. 7, showing the extension member moved upwardly from the raised position toward a tilt actuation position.
Figure 9:
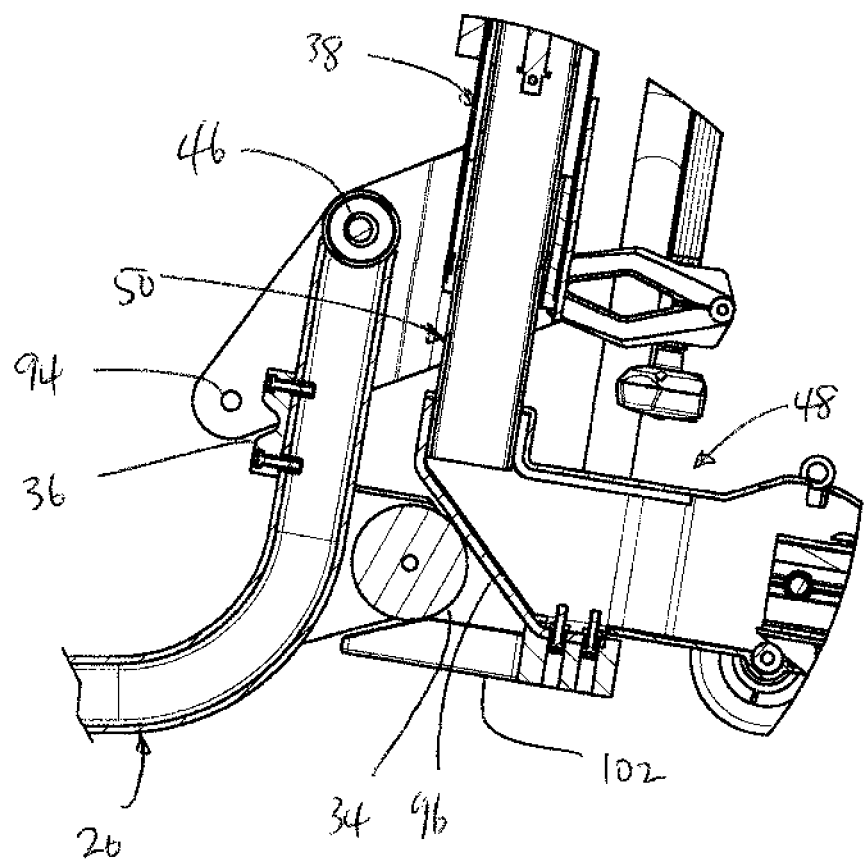
FIG. 9 is a view similar to FIGS. 7 and 8, showing the extension member moved further upwardly into a tilt actuation position.
Figure 10:
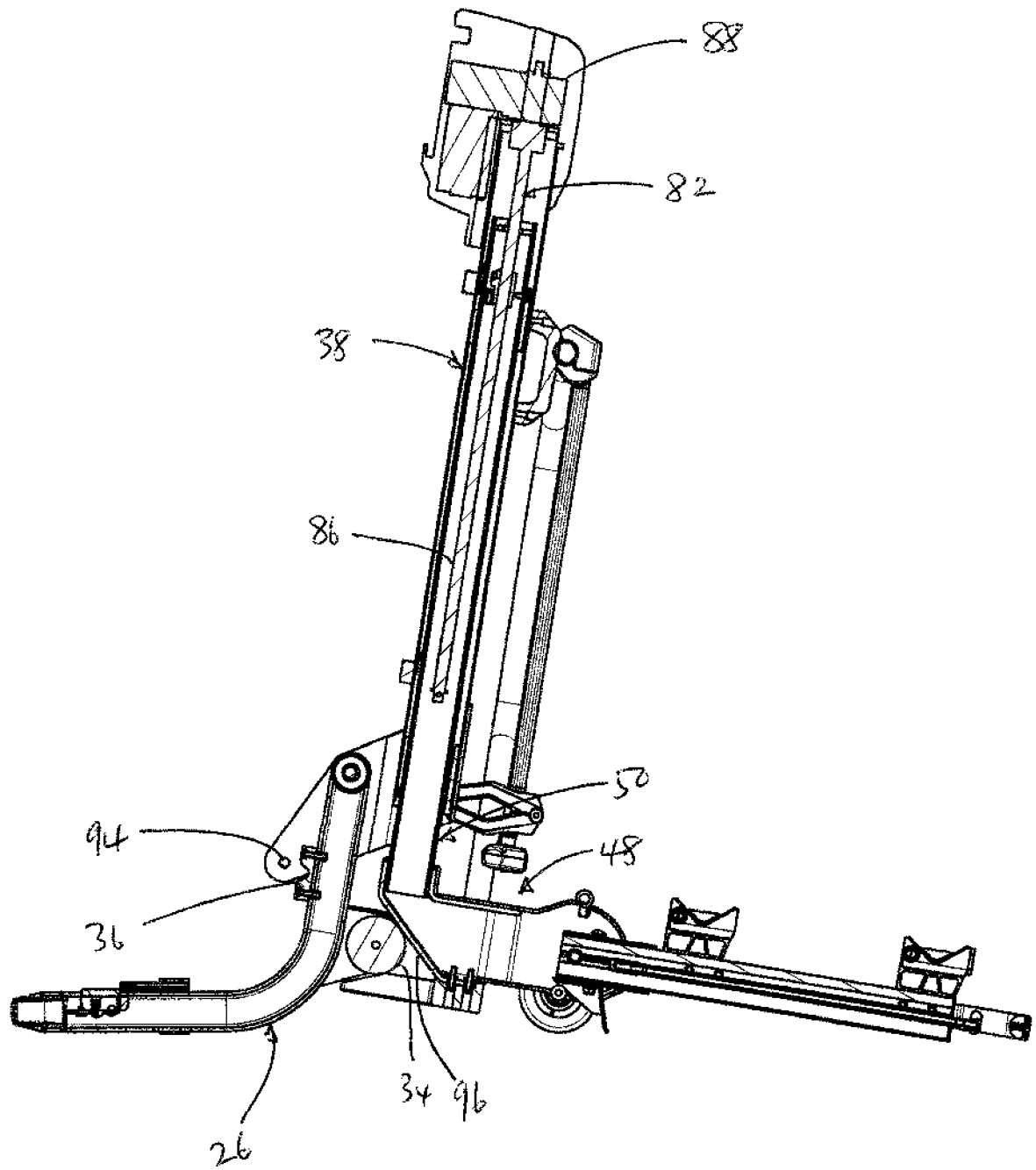
FIG. 10 is a section view similar to FIG. 4, showing the vehicle-mounted lift rack in a tilt position as in FIG. 9.

Base 48 is provided at its lower front area with a ramped tilt actuator surface 96. The tilt actuator surface 96 extends downwardly and rearwardly below the lower end of extension member 50, in vertical alignment with the front wall of extension member 50 against which roller 34 is engaged during upward and downward movement of extension number 50 between the raised and lowered positions. Tilt actuator surface 96 functions as shown in FIGS. 8 and 9, to allow mast 38 to be selectively tilted rearwardly. This is accomplished by raising extension member 50 above its normal operative raised position by operation of motor 88 to rotate lead screw 82, which lifts base 48 first into horizontal alignment with the roller 34 and then above roller 34. This upward movement of base 48 brings tilt actuator surface 96 and base 48 into horizontal alignment with roller 34, and the weight of equipment support portion 24 and equipment supported thereon causes equipment support portion 24 to rotate in a counterclockwise direction (with reference to FIGS. 8-10) about pin 46. Such pivoting movement of equipment support portion 24 about pin 46 causes mast 38 to tilt relative to the vehicle with which carrier 20 is engaged so as, for example, to allow access to the vehicle tailgate. Subsequent lowering of extension member 50 causes downward movement of base 48, with tilt actuator surface 96 then functioning to return mast 38 to its upright orientation.

Figure 11:
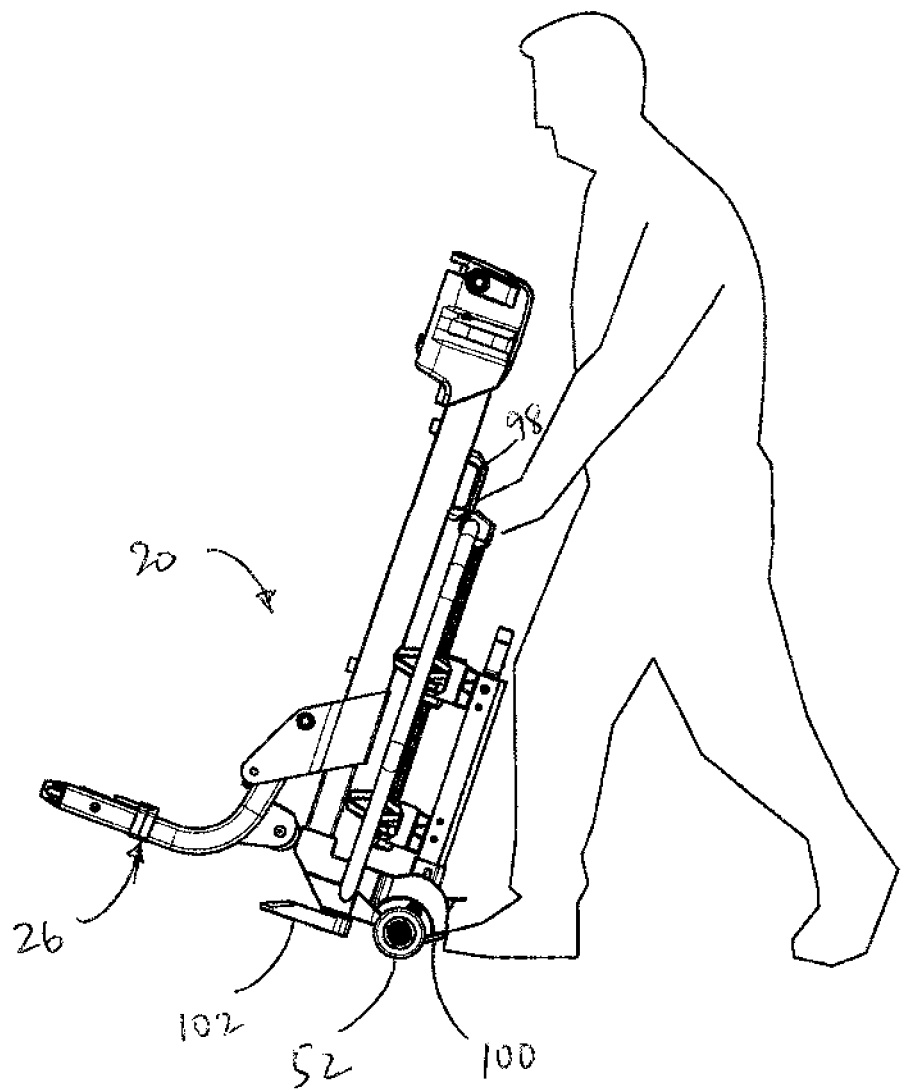
FIGS. 11-13 are side elevation views of the vehicle-mounted lift rack of FIGS. 1-10, showing the manner in which the vehicle-mounted lift rack is movable on a supporting surface such as a floor toward a vehicle, and operation of the vehicle-mounted lift rack to engage it with a hitch receiver of a vehicle.
Figure 12:
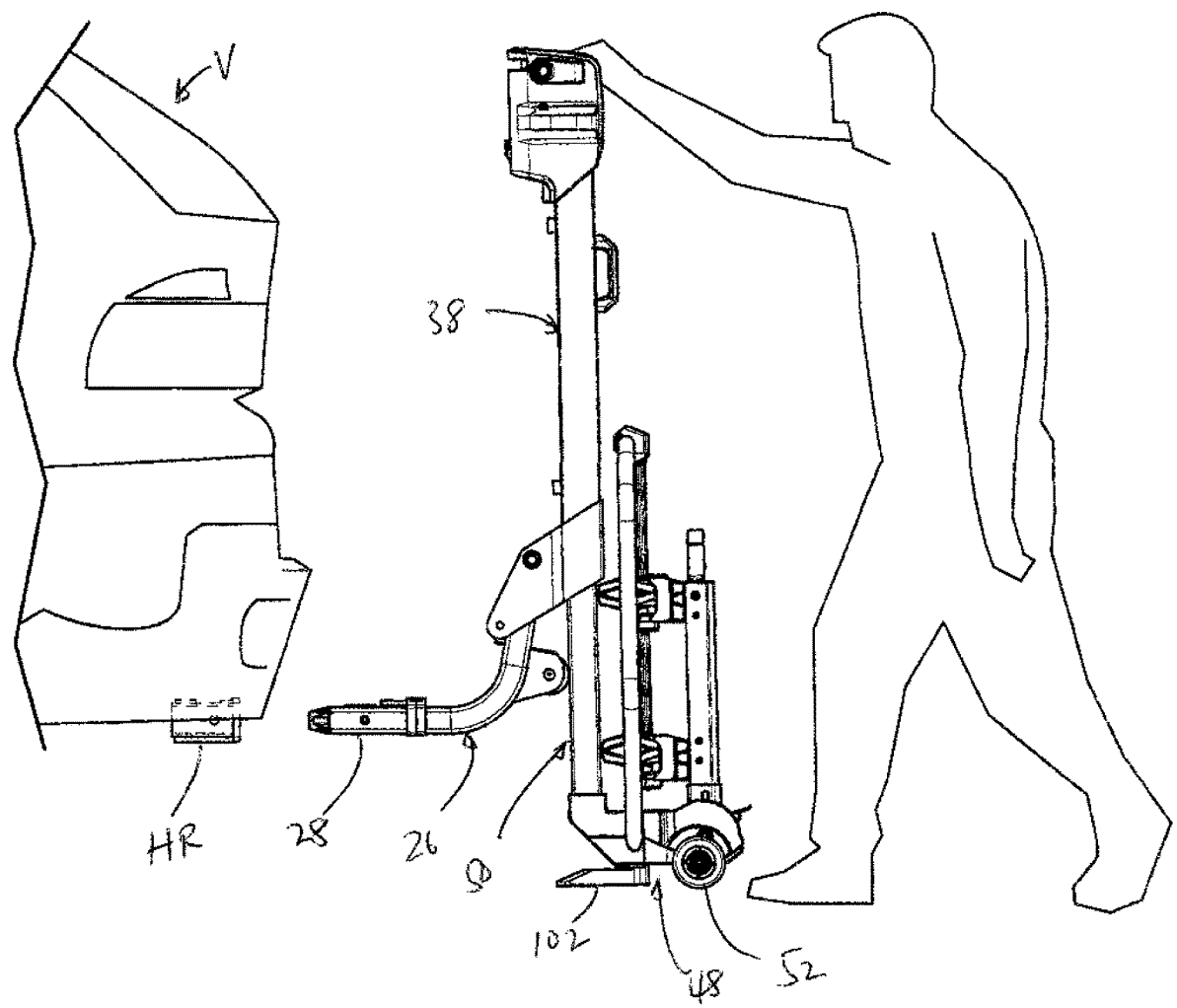
Figure 13:
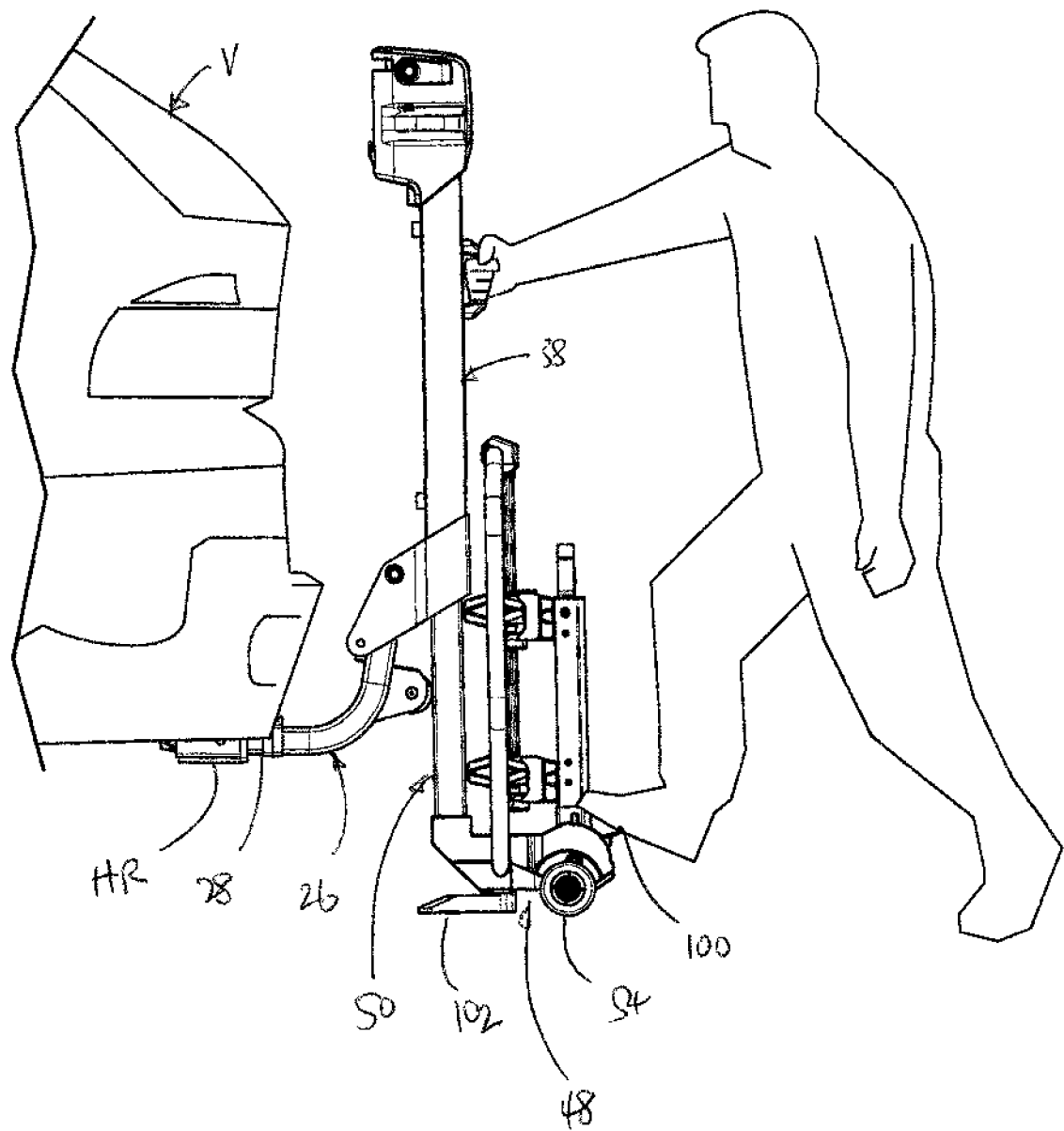

FIGS. 11-18 illustrate operation of the equipment carrier 20 and the manner in which it is engaged with a vehicle. As shown in FIG. 11, the user can advance carrier 20 toward a vehicle by grasping a handle 98 mounted to the mast 38, tipping the carrier 20 slightly and moving it on the ground or other supporting surface using wheels 52. Base 48 may include a toe plate 100 that can be engaged by the user's foot to assist in tipping carrier 20 in this manner. The carrier 20 can then be advanced toward a vehicle V, as shown in FIG. 12. The user can then return carrier 20 to its upright position. A foot 102, which is mounted to the bottom of base 48, is engaged with the ground forwardly of wheels 52 in order to position the carrier 20 in a generally upright orientation. In a manner as is known, a user can then engage an electrical connector of the vehicle V with wiring of carrier 20 that supplies power to the motor 88. Switch 92 can then be actuated so as to operate motor 88 in a manner that would normally extend extension member 50 downwardly but, with carrier 20 resting on the ground, functions to raise mast 38 upwardly. This causes hitch receiver engagement portion 22 to be raised, so that the user can bring front section 28 of hitch engagement member 26 to an elevation in alignment with the hitch receiver of the vehicle V, shown at HR. As shown in FIG. 13, the user can then use toe plate 100 and handle 98 to advance the carrier 20 so as to move the front section 28 of hitch engagement member 26 into the passage of the vehicle hitch receiver HR.

Figure 14:
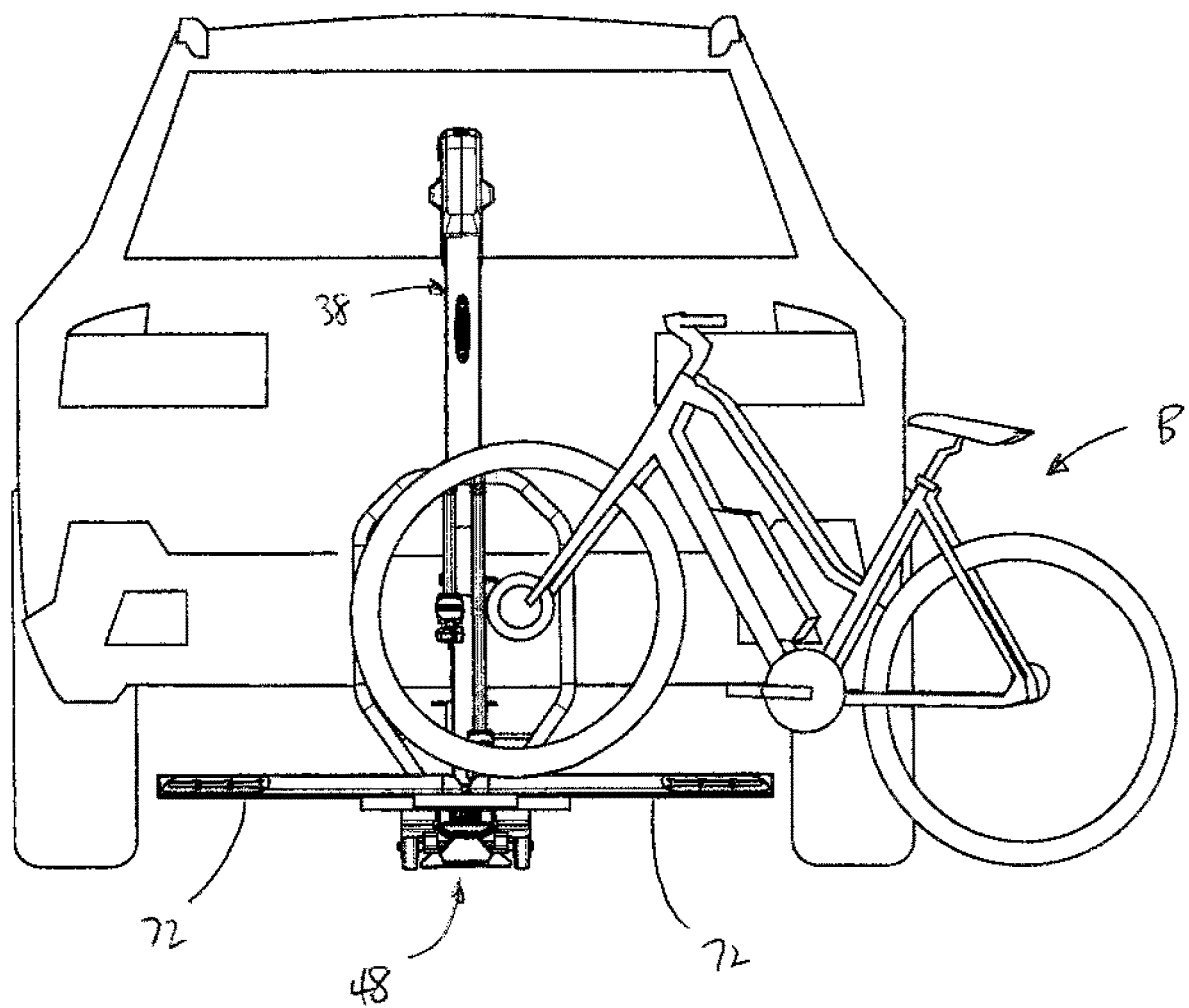
FIG. 14 is a rear elevation view of the vehicle-mounted lift rack of FIGS. 1-10 in a lowered position when engaged with the hitch receiver of a vehicle and advancement of a bicycle onto the vehicle-mounted lift rack.
Figure 15:
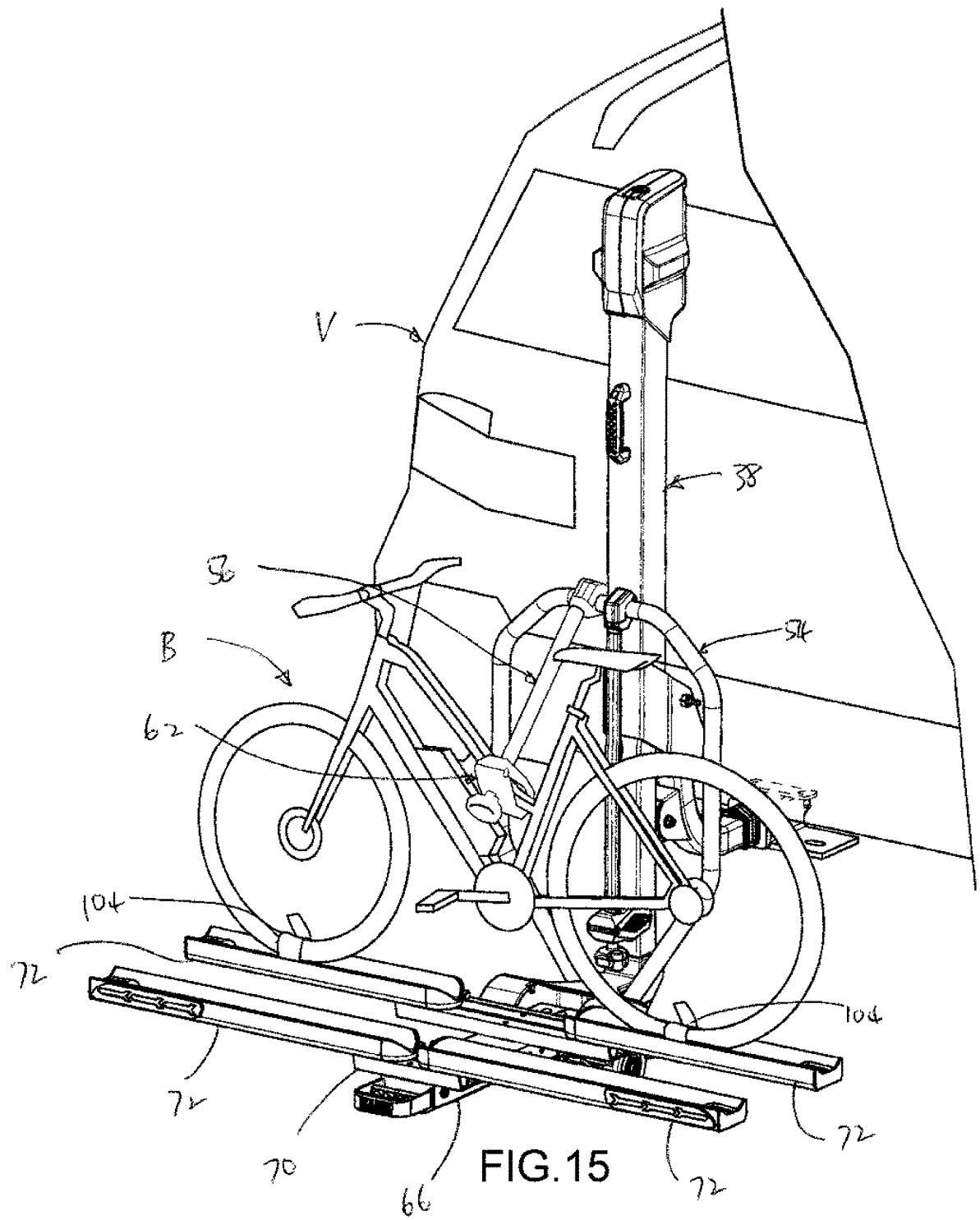
FIG. 15 is an isometric view of the vehicle-mounted lift rack as in FIG. 14 supporting a bicycle.
Figure 16:
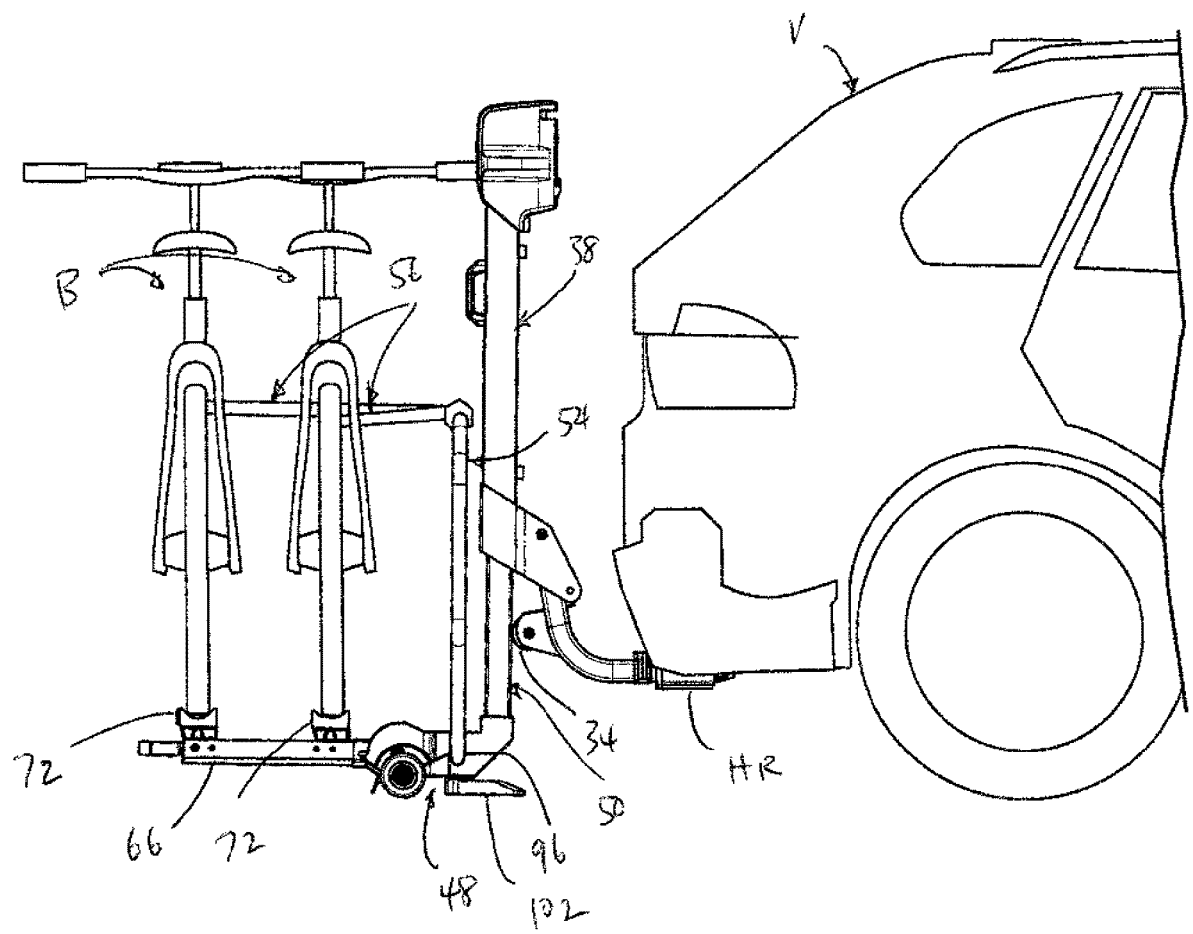
FIG. 16 is a side elevation view of the vehicle and the vehicle-mounted lift rack of FIG. 15, showing two bicycles loaded onto the vehicle-mounted lift rack.

With reference to FIG. 14, with extension member 50 extended such that equipment support portion 24 of carrier 20 is fully lowered and foot 102 is resting on the ground or other support surface, an item of equipment such as a bicycle B can be loaded onto the equipment carrier 20. To accomplish this, the user places equipment support 64 into its operative position by pivoting central support member 66 downwardly to a lowered position relative to base 48 such that tray members 72 face upwardly. The user then adjusts the lateral positioning of tray members 72 relative to the tray support member 70 according to the wheel base of the bicycle B to be loaded. The user can then advance the bicycle B onto the aligned tray members 72 by first lifting the front wheel of the bicycle B onto a first one of the tray members 72 and rolling the front bicycle wheel along the first tray member 72 and onto the aligned second tray member 72, until the rear wheel of the bicycle B comes into contact with the end of the first tray member 72. The user then continues to push the bicycle B so that the rear wheel of the bicycle B rolls onto the first tray member 72 as the front wheel of the bicycle B is advanced on the second tray member 72. Once the bicycle B is in advanced so that the front and rear wheels are positioned appropriately on the first and second tray members 72, as shown in FIG. 15, the user places ratchet straps or the like, such as shown at 104 (FIG. 15), to secure the lower area of each bicycle wheel to the underlying tray member 72. It is understood, of course, that securing devices or mechanisms other than ratchet straps 104 may be utilized to achieve the same result. The user then moves the appropriate one of stabilizing members 56 on frame 54 to a position that enables the engagement assembly 62 of the stabilizing member 56 to be secured to the frame of bicycle B. Engagement of the stabilizing member 56 with the bicycle B functions to maintain the bicycle B in an upright orientation, and acts in concert with the securement of the wheels of bicycle B to the underlying tray members 72 to securely support the bicycle B on the equipment support portion 24. If desired, another bicycle B may be loaded onto the other set of tray members 72 of equipment support portion 24 in a similar manner, as shown in FIG. 16. The bicycles B may representatively be electric or motorized bicycles, although it is understood that carrier 20 may be employed to transport any type of bicycle or other item of equipment.

Figure 17:
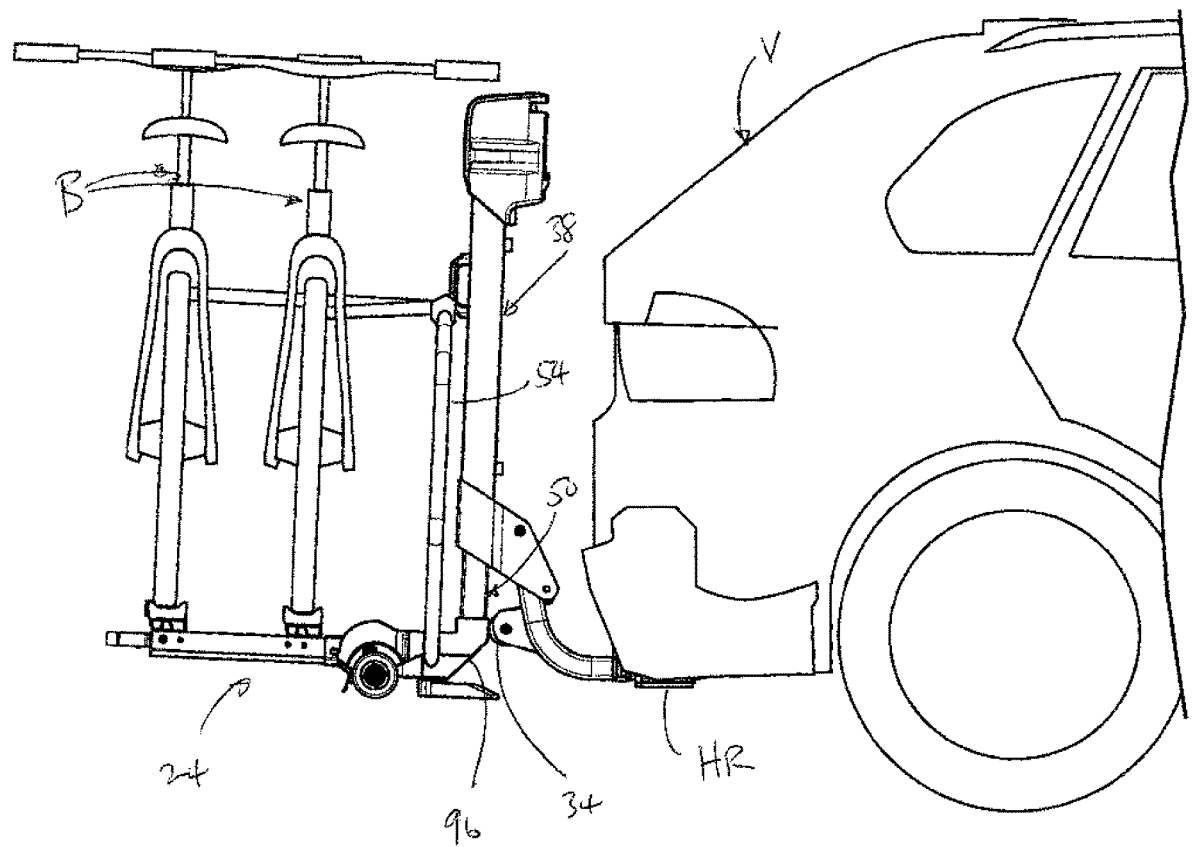
FIG. 17 is a view similar to FIG. 16, showing the vehicle-mounted lift rack in a raised position.
Figure 18:
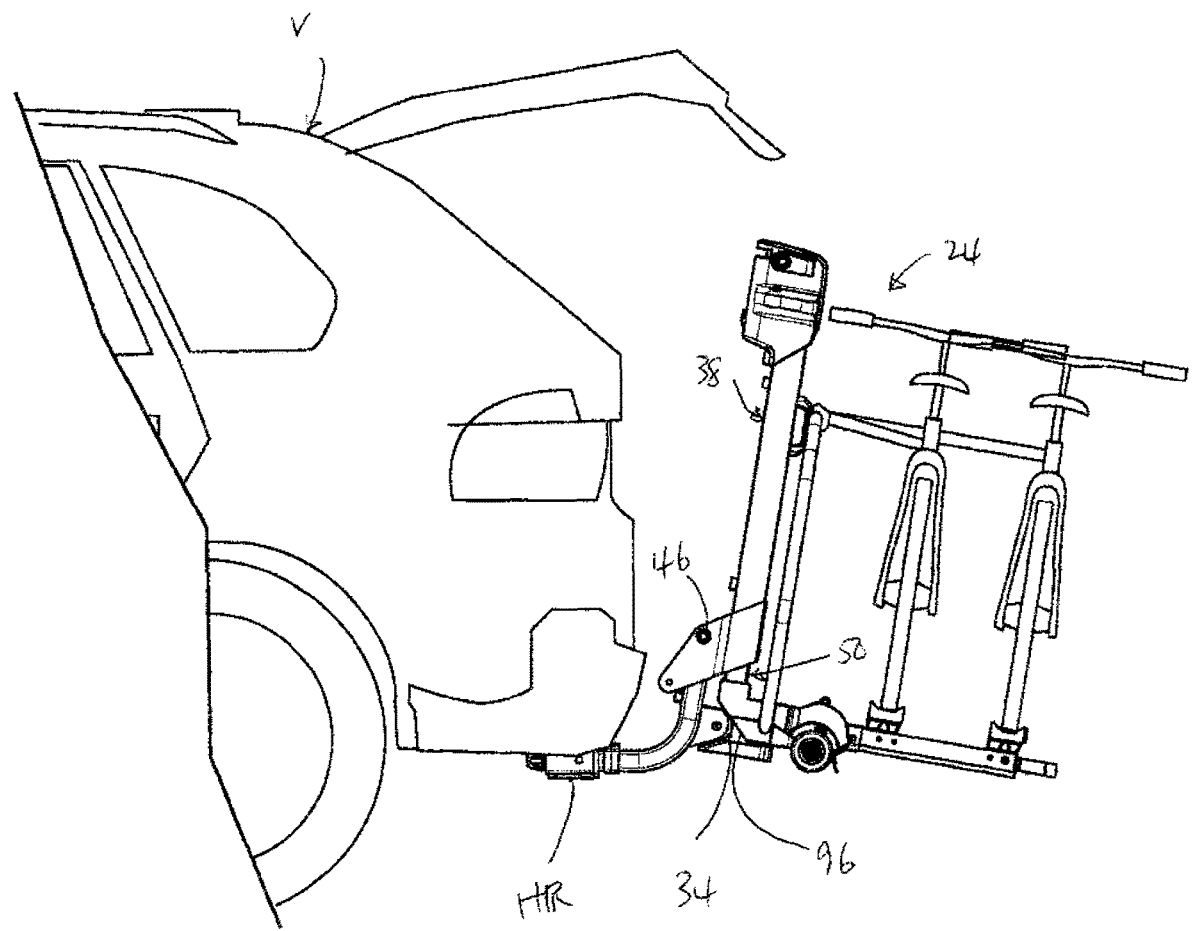
FIG. 18 is a view similar to FIGS. 16 and 17, showing the vehicle-mounted lift rack in the tilt position as in FIG. 10.

With the bicycles B loaded onto the equipment carrier 20 as described, the user can operate the switch 92 to actuate the motor 88 and raise the equipment support portion 24 of equipment carrier 20 to a transport position, as shown in FIG. 17. When it is desired to access the trunk or tailgate area of the vehicle V, the motor 88 is actuated to further raise the equipment support portion 24 to the tilt actuation position as described previously with respect to FIGS. 7-9, which pivots the equipment support portion 24 about the pivot pin 46 to a rearwardly tilted position, which moves mast 38 to rearwardly to allow the vehicle tailgate or trunk to be opened.

It can thus be appreciated that equipment carrier 20 enables a user to load equipment such as bicycles without the need to physically lift the entire weight of the bicycle, as is the case with a majority of known vehicle-mounted bicycle carriers.

It should be understood that the above description, while indicating representative embodiments of the present invention, is given by way of illustration and not of limitation. Many changes and modifications may be made within the scope of the present invention without departing from the spirit thereof, and the invention includes all such modifications.

Various additions, modifications, and rearrangements are contemplated as being within the scope of the following claims, which particularly point out and distinctly claim the subject matter regarding as the invention, and it is intended that the following claims cover all such additions, modifications, and rearrangements.

We claim:

1. An equipment carrier for transporting an item of equipment on a vehicle having a hitch receiver at the rear of the vehicle, comprising:
    a hitch receiver engagement portion that includes a hitch receiver engagement member configured to be received in the hitch receiver;
    an equipment support portion interconnected with the hitch receiver portion via a pivot connection, wherein the equipment support portion includes a mast defining an upper end and a lower end; an extension member that is movable relative to the mast between a lowered position, a raised position located above the lowered position, and a tilt actuation position located above the raised position; a drive arrangement interposed between the mast and the extension member for selectively moving the extension member between the lowered and raised positions; and an equipment support arrangement carried by the extension member, wherein the equipment support arrangement is movable via the drive arrangement between a lowered position, a raised position and a tilt position upon movement of the extension member between the lowered, raised and tilt actuation positions, respectively; and
    a tilt actuator arrangement interposed between the extension member and the hitch receiver engagement portion, wherein the tilt actuator arrangement is configured to pivot the equipment support portion about the pivot connection relative to the hitch receiver engagement portion from an upright position to the tilt position in response to movement of the extension member to the tilt actuation position, wherein in the tilt position the equipment support portion is tilted in a direction away from the rear of the vehicle.

2. The equipment carrier of claim 1, wherein the equipment support portion includes a mounting bracket interconnected with the mast, wherein the pivot connection is interposed between the hitch receiver engagement portion and the mounting bracket.

3. The equipment carrier of claim 2, wherein the hitch receiver engagement portion includes an upstanding mounting member, wherein the pivot connection is interposed between the upstanding mounting member and the mounting bracket of the equipment support portion, and further comprising a rotation limiting arrangement between the mounting bracket and the mounting member, wherein the rotation limiting arrangement is configured and arranged to assist in maintaining the equipment support portion in the upright position.

4. The equipment carrier of claim 3, wherein the mast defines a lower end, and wherein the extension member includes a lower end portion with which the equipment support arrangement is engaged, and further comprising a roller on the hitch receiver engagement portion, wherein the roller is engaged with the lower end portion of the extension member, wherein the roller is positioned to limit pivoting movement of the equipment support portion about the pivot connection in a direction toward the rear of the vehicle to assist in maintaining the equipment support portion in the upright position while guiding movement of the extension member between the lowered and raised positions.

5. The equipment carrier of claim 4, wherein the tilt actuator arrangement comprises a ramped actuator surface associated with the extension member, wherein movement of the extension member upwardly from the raised position toward the tilt actuation position causes the roller to ride on the ramped actuator surface and to cause pivoting movement of the equipment support portion to the tilt position about the pivot connection away from the vehicle.

6. The equipment carrier of claim 1, wherein the tilt actuator arrangement comprises a roller on the hitch receiver engagement portion and a ramped actuator surface on the equipment support portion that is movable with the extension member, wherein the roller facilitates movement of the extension member between the lowered position and the raised position and limits movement of the equipment support portion about the pivot connection, wherein movement of the extension member above the raised position to the tilt actuation position brings the roller into engagement with the ramped actuator surface to cause the equipment support portion to pivot to the tilt position about the pivot connection.

7. The equipment carrier of claim 1, wherein the equipment support portion comprises a base secured to a lower end defined by the extension member, wherein the base includes a wheel arrangement for facilitating movement of the equipment carrier on a supporting surface, and further comprising equipment support structure carried by the base.

8. The equipment carrier of claim 7, wherein the equipment support structure is pivotably engaged with the base for movement between a lowered operative position and a raised storage position.

9. The equipment carrier of claim 7, wherein the equipment support portion further comprises a central frame member extending from the base, and one or more equipment carrying members secured to the central frame member.

10. The equipment carrier of claim 9, wherein the one or more equipment carrying members comprises a tray support secured to the central frame member and a pair of tray members secured to the tray support.

11. The equipment carrier of claim 10, wherein the tray members are movably mounted to the tray support for movement between a retracted position and an extended position.

12. The equipment carrier of claim 7, wherein a frame is interconnected with the base and extends upwardly therefrom, and further comprising one or more equipment engagement members movably interconnected with the frame and selectively engageable with one or more items of equipment positioned on the equipment support portion.

13. A method of operating an equipment carrier for transporting an item of equipment on a vehicle having a hitch receiver at the rear of the vehicle, wherein the equipment carrier includes a hitch receiver engagement portion that includes a hitch receiver engagement member configured to be received in the hitch receiver, and an equipment support portion interconnected with the hitch receiver portion, wherein the equipment support portion includes a mast defining an upper end and a lower end; an extension member that is movable relative to the mast between a lowered position, a raised position located above the lowered position, and a tilt actuation position located above the raised position; a drive arrangement interposed between the mast and the extension member for selectively moving the extension member between the lowered and raised positions; and an equipment support arrangement carried by the extension member, comprising the acts of:
  moving the equipment support arrangement via the drive arrangement between a lowered position and a raised position upon movement of the extension member between the lowered and raised positions; and
  moving the mast from an upright position to a tilt position away from the rear of the vehicle in response to movement of the extension member from the raised position to the tilt actuation position via upward movement of the extension member relative to the mast from the raised position to the tilt actuation position.

14. The method of claim 13, wherein a pivot connection is interposed between the equipment support portion and the hitch receiver engagement portion, wherein movement of the extension member to the tilt actuation position causes the equipment support portion to pivot about the pivot connection to place the mast in the tilt position.

15. The method of claim 14, wherein a roller is interposed between the extension member and the hitch receiver engagement portion to guide movement of the extension member between the raised and lowered positions, and wherein movement of the extension member to the tilt actuation position results in movement of the roller into engagement with a tilt actuator surface that is configured to allow the equipment support portion to pivot about the pivot connection.

16. The method of claim 15, wherein the roller is disposed on the hitch receiver engagement portion and wherein the tilt actuator surface is disposed on the equipment support portion and movable with the extension member.

17. The method of claim 15, wherein the roller bears against a bearing surface of the extension member during movement of the extension member between the raised and lowered positions, and wherein the tilt actuator surface comprises a ramped actuator surface located below the bearing surface that is moved into alignment with the roller when the extension member is moved from the raised position to the tilt actuation position.

18. An equipment carrier for transporting an item of equipment on a vehicle having a hitch receiver at the rear of the vehicle, comprising:
  a hitch receiver engagement portion that includes a hitch receiver engagement member configured to be received in the hitch receiver and an upstanding mounting member;
  an equipment support portion interconnected with the hitch receiver portion via a pivot connection, wherein the equipment support portion includes a mast defining an upper end and a lower end; a mounting bracket interconnected with the mast, wherein the pivot connection is interposed between the mounting bracket and the upstanding mounting member of the hitch receiver engagement portion; an extension member that is movable relative to the mast between a lowered position and a raised position; a drive arrangement interposed between the mast and the extension member for selectively moving the extension member between the lowered and raised positions; and an equipment support arrangement carried by the extension member, wherein the equipment support arrangement is movable via the drive arrangement between a lowered position and a raised position upon movement of the extension member between the lowered and raised positions;
a tilt actuator arrangement that provides pivoting movement of the equipment support portion about the pivot connection relative to the hitch receiver engagement portion from an upright position to a tilt position in response to movement of the extension member to a tilt actuation position; and
a rotation limiting arrangement between the mounting bracket and the upstanding mounting member, wherein the rotation limiting arrangement is configured and arranged to assist in maintaining the equipment support portion in the upright position.

19. The equipment carrier of claim 18, wherein the mast defines a lower end, and wherein the extension member includes a lower end portion with which the equipment support arrangement is engaged, and further comprising a roller on the hitch receiver engagement portion, wherein the roller is engaged with the lower end portion of the extension member, wherein the roller is positioned to limit pivoting movement of the equipment support portion about the pivot connection toward the rear of the vehicle to assist in maintaining the equipment support portion in the upright position while guiding movement of the extension member between the lowered and raised positions.

20. The equipment carrier of claim 19, wherein the tilt actuator arrangement comprises a ramped actuator surface associated with the extension member, wherein movement of the extension member upwardly from the raised position causes the roller to ride on the ramped actuator surface and to cause pivoting movement of the equipment carrier portion to the tilt position about the pivot connection away from the rear of the vehicle.

21. An equipment carrier for transporting an item of equipment on a vehicle having a hitch receiver at the rear of the vehicle, comprising:
a hitch receiver engagement portion that includes a hitch receiver engagement member configured to be received in the hitch receiver;
an equipment support portion interconnected with the hitch receiver portion via a pivot connection, wherein the equipment support portion includes a mast defining an upper end and a lower end, an extension member that is movable relative to the mast between a lowered position and a raised position, a drive arrangement interposed between the mast and the extension member for selectively moving the extension member between the lowered and raised positions, and an equipment support arrangement carried by the extension member, wherein the equipment support arrangement is movable via the drive arrangement between a lowered position and a raised position upon movement of the extension member between the lowered and raised positions; and
a tilt actuator arrangement that provides pivoting movement of the equipment support portion about the pivot connection relative to the hitch receiver engagement portion from an upright position to a tilt position away from the rear of the vehicle in response to movement of the extension member to a tilt actuation position;
wherein the tilt actuator arrangement comprises a roller on the hitch receiver engagement portion and a ramped actuator surface on the equipment support portion that is movable with the extension member, wherein the roller facilitates movement of the extension member between the lowered position and the raised position and limits movement of the equipment support portion about the pivot connection, wherein movement of the extension member above the raised position brings the roller into engagement with the ramped actuator surface to cause the equipment support portion to pivot to the tilt position about the pivot connection.

22. A method of operating an equipment carrier for transporting an item of equipment on a vehicle having a hitch receiver at the rear of the vehicle, wherein the equipment carrier includes a hitch receiver engagement portion that includes a hitch receiver engagement member configured to be received in the hitch receiver, and an equipment support portion interconnected with the hitch receiver portion, wherein the equipment support portion includes a mast defining an upper end and a lower end, an extension member that is movable relative to the mast between a lowered position and a raised position, a drive arrangement interposed between the mast and the extension member for selectively moving the extension member between the lowered and raised positions, and an equipment support arrangement carried by the extension member, comprising the acts of:
moving the equipment support arrangement via the drive arrangement between a lowered position and a raised position upon movement of the extension member between the lowered and raised positions;
moving the mast from an upright position to a tilt position away from the rear of the vehicle in response to movement of the extension member from the raised position to a tilt actuation position via upward movement of the extension member relative to the mast;
wherein a pivot connection is interposed between the equipment support portion and the hitch receiver engagement portion, wherein movement of the extension member to the tilt actuation position causes the equipment support portion to pivot about the pivot connection to place the mast in the tilt position; and
wherein a roller is interposed between the extension member and the hitch receiver engagement portion to guide movement of the extension member between the raised and lowered positions, and wherein movement of the extension member to the tilt actuation position results in movement of the roller into engagement with a tilt actuator surface that is configured to allow the equipment support portion to pivot about the pivot connection.

23. The method of claim 22, wherein the roller is disposed on the hitch receiver engagement portion and wherein the tilt actuator surface is disposed on the equipment support portion and movable with the extension member.

24. The method of claim 22, wherein the roller bears against a bearing surface of the extension member during movement of the extension member between the raised and lowered positions, and wherein the tilt actuator surface comprises a ramped actuator surface located below the bearing surface that is moved into alignment with the roller when the extension member is moved from the raised position to the tilt actuation position.

* * * * *